(12) United States Patent
Mandal et al.

(10) Patent No.: US 7,064,095 B2
(45) Date of Patent: Jun. 20, 2006

(54) DOPED ALPHA-BETA SIALON CERAMICS

(75) Inventors: Hasan Mandal, Eskisehir (TR); Ferhat Kara, Eskisehir (TR); Alpagut Kara, Eskishir (TR); Servet Turan, Eskisehir (TR)

(73) Assignee: Ceramtec AG, Innovative Ceramic Engineering, Plochingen (DE)

( * ) Notice: Subject to any disclaimer, the term of this patent is extended or adjusted under 35 U.S.C. 154(b) by 18 days.

(21) Appl. No.: 10/467,425

(22) PCT Filed: Feb. 28, 2002

(86) PCT No.: PCT/TR02/00006

§ 371 (c)(1),
(2), (4) Date: Oct. 23, 2003

(87) PCT Pub. No.: WO02/070419

PCT Pub. Date: Sep. 12, 2002

(65) Prior Publication Data

US 2004/0067838 A1   Apr. 8, 2004

(30) Foreign Application Priority Data

Mar. 1, 2001   (TR)   ............................ a 2001 00538

(51) Int. Cl.
*C04B 35/599*   (2006.01)
(52) U.S. Cl. ..................... 501/98.2; 501/98.3
(58) Field of Classification Search ............... 501/98.2, 501/98.3
See application file for complete search history.

(56) References Cited

U.S. PATENT DOCUMENTS

| | | | | |
|---|---|---|---|---|
| 5,173,458 A | * | 12/1992 | Nishioka et al. | 501/97.3 |
| 5,227,346 A | * | 7/1993 | Hwang et al. | 501/98.2 |
| 5,413,972 A | | 5/1995 | Hwang et al. | |
| 6,693,054 B1 | * | 2/2004 | Yeckley | 501/98.2 |
| 6,824,727 B1 | * | 11/2004 | Roy et al. | 264/414 |
| 2004/0102305 A1 | * | 5/2004 | Yeckley | 501/98.2 |
| 2005/0020432 A1 | * | 1/2005 | Roy et al. | 501/98.2 |

* cited by examiner

*Primary Examiner*—Karl Group
(74) *Attorney, Agent, or Firm*—Fulbright & Jaworski L.L.P.

(57) ABSTRACT

This invention is about SiALON ceramics comprising an alpha SiAlON, a beta SiAlON and an intergranular amorphous and/or crystalline phase. Said alpha SiALON phase was prepared from a multi-cationic mixture including the element of calcium, at least one of yttrium and/or a rare earth element with atomic number greater than 62 and at least one of a rare earth element with atomic number equal or smaller than 62. The second phase, beta SiALON contains elements of Si, Al, O, N. The third phase, amorphous and/or crystalline intergranular phase contains in addition to elements of Si, AL, O, N, element of calcium, at least one of yttrium and/or a rare earth element with atomic number greater than 62 and at least one of a rare earth element with atomic number equal or smaller than 62. This material with its toughness, high fracture resistance and high temperature resistance is useful for cutting tool applications and components in machinery and engines.

4 Claims, No Drawings

DOPED ALPHA-BETA SIALON CERAMICS

TECHNICAL FIELD

This invention is about alpha and beta SiAlON composite comprising an alpha SiAlON, a beta SiAlON and an intergranular amorphous and/or crystalline phase. Said alpha SiAlON phase was prepared from a multi-cationic mixture including element of calcium, at least one of yttrium and/or a rare earth element with atomic number greater than 62 and at least one of a rare earth element with atomic number equal or smaller than 62.

BACKGROUND OF THE INVENTION

Silicon nitride and SiAlON ceramics are engineering ceramic materials which are characterised by an excellent combination of mechanical properties of stiffness, strength, hardness and toughness which can, in theory, be retained to very high (>1000° C.) temperatures.

The SiAlONs are based on compositions containing the elements Si, Al, O, N, hence the acronym. The most successful commercial SiAlON (beta SiAlON) has the beta-$Si_3N_4$ crystal structure, but with some of the silicon atoms replaced by aluminium atoms and the same number of nitrogen atoms replaced by oxygen atoms to form $Si_{6-z}Al_zO_zN_{8-z}$ where $0<z<4.2$. The other common SiAlON phase is alpha SiAlON, which has the general composition $M_xSi_{12-m-n}Al_{m+n}O_nN_{16-n}$, where m represents the number of Si—N bonds replaced by Al—N per unit cell, n represents the number of Si—N bonds replaced by Al—O per unit cell, $0<x<2$, and M is one of the cations including Li, Mg, Ca, Y and rare earths (excluding La, Ce).

Beta SiAlON is a strong engineering ceramic with good oxidation and creep resistance up to 1300° C. Alpha SiAlON has excellent hardness, but slightly worse strength, toughness and oxidation resistance than beta SiAlON. By selecting a particular phase, it is possible to define quite precisely an optimum combination of mechanical properties. Combinations of alpha-beta SiAlONs are in thermodynamic equilibrium and so optimised composite materials can be produced in this way.

SiAlONs are usually formed by mixing $Si_3N_4$, $Al_2O_3$, AlN powders with one or more metal oxides (often including $Y_2O_3$), compacting the powder to the desired shape, and then firing the component at 1750° C. for a few hours. The function of the metal oxide is to react with the silica, always present on the surface of each silicon nitride particle, to form a liquid phase, which assists densification. After sintering, the liquid phase, which also contains nitrogen, cools to form an amorphous phase between the SiAlON grains. In subsequent use of these materials, the amorphous phase starts to soften at temperatures slightly above its glass transition temperature ($T_g$) and the mechanical properties deteriorate rapidly. Even with the most refractory oxide additives, ($T_g$) is barely in excess of 1000° C.

In an attempt to provide a ceramic SiAlON composition, which is usable in high temperature applications, prior art methods and compositions have taught the combination of alpha SiAlON, beta SiAlON and intergranular phases.

U.S. Pat. No. 4,563,433 and U.S. Pat. No. 4,711,644 disclose a ceramic containing alpha SiAlON, beta SiAlON and an intergranular phase. This alpha SiAlON phase is formed by using yttrium and/or other rare earth elements.

U.S. Pat. No. 5,200,374 discloses a ceramic containing alpha SiAlON, beta SiAlON and intergranular phase. This alpha SiAlON phase is formed by using rare earth elements selected from the group consisting of Ho, Er, Tm, Yb and Lu.

U.S. Pat. No. 5,227,346 discloses a ceramic containing alpha SiAlON, beta SiAlON and intergranular phase. This SiAlON material is formed by using a compound selected from the group consisting of oxides and nitrides of Sr, at least one of Ca, Mg, Li or Na and at least one of yttrium or rare earth elements.

The mentioned prior arts use yttrium and/or rare earth cations except U.S. Pat. No. 5,227,346. Although using yttrium and/or rare earth cations gives required multi-phase SiAlON ceramic materials, microstructure of these ceramics and to greater extent mechanical and/or thermal properties may not be the desired ones. This can be explained by transformation of alpha SiAlON to beta SiAlON in use where there is a depletion of alpha SiAlON phase.

Primary objective of the present art is to produce a multi-phase SiAlON material with improved properties and stable microstructure at high temperatures. It is also a further objective to design a composition in which the amount of glassy phase can be minimised by using suitable combination of cations.

SUMMARY OF THE INVENTION

The objective of the present invention is to produce SiAlON material containing three phases, especially for use as cutting materials. These phases are comprised of alpha and beta SiAlONs and amorphous and/or crystalline grain boundary phase(s). The alpha SiAlON contains element of calcium, at least one of yttrium and/or a rare earth element with atomic number greater than 62 and at least one of a rare earth element with atomic number equal or smaller than 62. The alpha SiAlON exists as either equiaxed or elongated grain morphology while beta SiAlON phase exists only in elongated form. By adjusting the relative amounts of these phases, materials can be tailored to give high hardness, strength and toughness both at room and high temperature.

Present invention discloses incorporation of three different types of cations into alpha SiAlON structure. Calcium, which has the largest alpha SiAlON former, stabilises alpha SiAlON, which does not transform to beta after sintering during cooling period and also reduces the amount of residual grain boundary phase. Yttrium or a rare earth element with atomic number greater than 62 also stabilises the alpha SiAlON and increases the hardness of the final material. A rare earth element with atomic number equal or smaller than 62 helps develop elongated grain morphology for both beta and alpha SiAlONs. Combination of three different types of cations significantly reduces the amorphous and/or crystalline grain boundary phase(s) after sintering.

Further disclosed is a method for producing the multi-phase SiAlON ceramic material. The method includes the steps of (a) preparing a mixture of $Si_3N_4$, AlN, $Al_2O_3$ a multi-cation mixture composition which includes a compound selected from the group consisting of oxides and nitrides of calcium; at least one compound selected from the group consisting of oxides and nitrides of yttrium and/or a rare earth element with atomic number greater than 62; and at least one compound selected from the group consisting of oxides and nitrides of a rare earth element with atomic number equal or smaller than 62, (b) attrition milling them in water, (c) drying the mixture and (d) pressing at 150 MPa and (e) sintering between 1600–1850° C. at least 18 minutes in a gas pressure sintering furnace at a pressure between 1–100 bar.

DETAILED DESCRIPTION OF THE INVENTION

This invention concerns a multi-phase SiAlON ceramic material comprising a mixture of three phases. These phases are comprised of alpha and beta SiAlONs and amorphous and/or crystalline grain boundary phase(s). The alpha SiAlON has a composition of $M_xSi_{12-m-n}Al_{m+n}O_nN_{16-n}$, where m represents the number of Si—N bonds replaced by Al—N per unit cell, n represents the number of Si—N bonds replaced by Al—O per unit cell, $0<x<2$, and M is (i) calcium, (ii) at least one of yttrium and/or a rare earth element with atomic number greater than 62 and (iii) at least one of a rare earth element with atomic number equal or smaller than 62. This phase of alpha SiAlON was found to be a crystalline phase existing as fine grains with equiaxed or elongated grain morphology depending on starting composition. Micrographs were taken by scanning electron microscopy (SEM) and chemical analyses of alpha-SiAlONs were carried out by energy dispersive X-ray analysis (EDX). EDX analysis results showed three different types of cation which include (i) calcium, (ii) at least one of yttrium and/or a rare earth element with atomic number greater than 62 and (iii) at least one of a rare earth element with atomic number equal or smaller than 62.

The second phase of the SiAlON ceramic material is beta SiAlON having the general formula $Si_{6-z}Al_zO_zN_{8-z}$ where $0<z<4.2$ but in this invention z value is between 0 and 1.6. Micrograph taken by SEM reveals that this phase has elongated shape. The weight percent ratio of alpha to beta SiAlON is preferably changing from about 20:80 to about 80:20.

The third phase of the multi-phase SiAlON ceramic material comprises an intergranular amorphous and/or crystalline phase(s) containing Si, Al, O, N in combination with (i) calcium, (ii) at least one of yttrium and/or a rare earth element with atomic number greater than 62 and (iii) at least one of a rare earth element with atomic number equal or smaller than 62. The intergranular amorphous and/or crystalline phase(s) was found to be present in an amount between 0–16 percent by volume based upon total material volume.

The method of producing the multi phase SiAlON material includes the steps of (a) preparing a mixture of $Si_3N_4$, AlN, $Al_2O_3$ and a multi-cation mixture composition which includes a compound selected from the group consisting of oxides and nitrides of calcium; at least one compound selected from the group consisting of oxides and nitrides of yttrium and/or a rare earth element with atomic number greater than 62; and at least one compound selected from the group consisting of oxides and nitrides of a rare earth element with atomic number equal or smaller than 62, (b) attrition milling them in water, (c) drying the mixture and (d) pressing at 150 MPa and (e) sintering between 1600–1850° C. at least 18 minutes in a gas pressure sintering furnace at a pressure between 1–100 bar.

The following examples serve to illustrate the novel multi-phase SiAlON material of this invention and the method of preparing the novel SiAlON material. The examples are not intended to limit the scope of this invention but only given to help disclose the invention. All percentages are by weight unless otherwise noted.

Example 1

| Compound | Weight percent |
|---|---|
| $Si_3N_4$ | 89.34 |
| AlN | 5.330 |
| $Y_2O_3$ | 4.800 |
| $Sm_2O_3$ | 0.412 |
| $CaCO_3$ | 0.118 |

A mixture of five components given above, in the amounts indicated, was mixed by attrition milling with $Si_3N_4$ media in water for two hours to form a powder mixture then appropriate binders, lubricants and plasticisers were added and dried by a spray drier. Dried powders were sieved and pressed by uniaxially with a pressure of 150 MPa. Green pellets were sintered with five step sintering cycle to 1800° C. for 2 hours in a gas pressure sintering furnace at a pressure up to 22 bar. The material was fully dense with a density of 3.26 g/cc measured by water immersion. X-ray diffraction showed both alpha and beta SiAlONs. An alpha to beta ratio of 50:50 was obtained.

Example 2

| Compound | Weight percent |
|---|---|
| $Si_3N_4$ | 89.22 |
| AlN | 5.32 |
| $Y_2O_3$ | 3.99 |
| $Sm_2O_3$ | 1.234 |
| $CaCO_3$ | 0.236 |

A mixture of five components given above, in the amounts indicated, was mixed by attrition milling and sintered by gas pressure sintering as in Example 1. The material density was measured at 3.25 g/cc. X-ray diffraction showed both alpha and beta SiAlONs. An alpha to beta ratio of 50:50 was obtained.

Example 3

| Compound | Weight percent |
|---|---|
| $Si_3N_4$ | 72.52 |
| AlN | 13.61 |
| $Al_2O_3$ | 6.61 |
| $Yb_2O_3$ | 2.74 |
| $Sm_2O_3$ | 2.43 |
| $CaCO_3$ | 2.09 |

A mixture of six components given above, in the amounts indicated, was mixed by attrition milling and sintered by gas pressure sintering as in Example 1. The material density was measured at 3.25 g/cc. X-ray diffraction showed both alpha and beta SiAlONs. An alpha to beta ratio of 75:25 was obtained. The amount of grain boundary phase is significantly reduced in this example.

What is claimed is:

1. A multi-phase SiAlON ceramic material having at least a first, second and third phase, comprising:
   (a) a first phase of alpha-SiAlON having the general formula $M_xSi_{12-m-n}Al_{m+n}O_nN_{16-n}$ wherein $0<x\leq2$ and M is a multi-cationic mixture comprising
   (i) element of calcium;
   (ii) at least one of yttrium and/or a rare earth element with atomic number greater than 62;
   (iii) at least one of rare earth elements with an atomic number equal or smaller than 62;
   (b) a second phase of beta SiAlON having the general formula $Si_{6-z}Al_zO_zN_{8-z}$ wherein $0<z<1.6$; and
   (c) a third phase of an intergranular amorphous and/or crystalline nature containing in addition to elements of Si, Al, O and N,
   (v) element of calcium;
   (vi) at least one of yttrium and/or a rare earth element with atomic number greater than 62; and
   (vii) at least one rare earth element with atomic number equal to or less than 62.

2. The ceramic material of claim 1, wherein the intergranular phase is present in an amount between 0–16 percent by volume based upon total material volume.

3. The ceramic material of claim 1, wherein the weight ratio of alpha-SiAlON to beta-SiAlON is changing from about 20:80 to about 80:20.

4. A method of producing a SiAlON ceramic material having at least a first, second and third phase comprising:
   preparing a mixture of $Si_3N_4$, AlN, $Al_2O_3$ and a multi-cation mixture composition which includes a compound selected from the group consisting of oxides and nitrides of calcium; at least one compound selected from the group consisting of oxides and nitrides of yttrium and/or a rare earth element with an atomic number greater than 62; and at least one compound selected from the group consisting of oxides and nitrides of a rare earth element with an atomic number equal or smaller 62; attrition milling the mixture in water; drying the mixture; pressing at 150 MPa; sintering between 1600–1850° C. at least 18 minutes in a gas pressure sintering furnace at a pressure between 1–100 bar.

* * * * *